United States Patent [19]

Meisezahl et al.

[11] Patent Number: 4,983,999
[45] Date of Patent: Jan. 8, 1991

[54] CAMERA WITH FLIP-UP FLASH UNIT

[75] Inventors: William J. Meisezahl; David J. Glogan, both of Rochester; William L. Burnham, Leroy, all of N.Y.

[73] Assignee: Eastman Kodak Company, Rochester, N.Y.

[21] Appl. No.: 478,909

[22] Filed: Feb. 12, 1990

[51] Int. Cl.⁵ .............................................. G03B 15/05
[52] U.S. Cl. ................................ 354/149.11; 354/126; 354/145.1
[58] Field of Search ................... 354/126, 145.1, 149.1, 354/149.11, 187, 219, 288; D16/211, 209

[56] References Cited

U.S. PATENT DOCUMENTS

| D. 284,768 | 7/1986 | Nakayama | D16/211 |
| D. 284,973 | 8/1986 | Hansen | D16/209 |
| D. 285,087 | 8/1986 | Hansen | D16/211 |
| 4,231,645 | 11/1980 | Davis et al. | 354/145.1 |
| 4,319,818 | 3/1982 | Sawara | 354/145.1 |
| 4,350,420 | 9/1982 | Engelsmann et al. | 354/149.11 |
| 4,557,571 | 12/1985 | Reibl | 354/149.11 |
| 4,690,531 | 9/1987 | Hansen et al. | 354/149.11 |
| 4,796,034 | 1/1989 | Leonard et al. | 354/149.11 |
| 4,819,016 | 4/1989 | Leonard et al. | 354/145.1 |
| 4,847,647 | 7/1989 | Ueda | 354/149.1 |

Primary Examiner—A. A. Mathews
Attorney, Agent, or Firm—Roger A. Fields

[57] ABSTRACT

A camera has a flip-up flash unit including an overcenter spring part that urges the flash unit alternatively to a folded storage position and to a non-folded operative position.

5 Claims, 2 Drawing Sheets

CAMERA WITH FLIP-UP FLASH UNIT

CROSS-REFERENCE TO RELATED APPLICATION(S)

Reference is made to commonly assigned copending application Ser. No. 07/478,910 entitled CAMERA WITH FLIP-UP FLASH UNIT, and filed Feb. 12, 1990, in the names of William L. Burnham et al.

BACKGROUND OF THE INVENTION

1. Field of the Invention

The invention relates generally to the field of photography and particularly to a camera with a flip-up flash unit.

2. Description of the Prior Art

A current trend in camera design is to incorporate an electronic flash unit in the camera housing and yet make such housing relatively small in size in order to increase its ease of storage, portability and handling. Examples of smaller size cameras with built-in electronic flash units are the various disk film cameras, such as previously sold by Eastman Kodak Company and others. As a consequence of making a camera smaller in size, the separation between a built-in flash unit and the taking lens is reduced, thereby possibly creating an undesirable effect commonly known as "red-eye". When using a flash unit and a color print film, red-eye is typified by the pupils in the eyes of a person being photographed coming out red-tinted on a developed color print. Such phenonmenon is attributable to the incidence into the taking lens of the red light reflected from the retinas in the person's eyes illuminated by the flash light.

Red-eye may be substantially avoided by increasing the separation between the flash unit and the taking lens. As a result, light from the flash unit will reach the eyes of a person being photographed at too great an angle to be reflected by his retinas into the taking lens. In U.S. Pat. Nos. 4,231,645, granted Nov. 4, 1980, 4,319,818, granted Mar. 16, 1982, 4,557,571, granted Dec. 10, 1985, D. 284,973 granted Aug. 5, 1986, D. 285,087, granted Aug. 12, 1986, and 4,847,647, granted July 11, 1989, red-eye appears to be substantially avoided without increasing the size of a compact 35 mm camera to any great degree by providing a built-in electronic flash unit that is pivotable with respect to the camera housing. The flash unit is pivotable between an inactive folded position in which it forms an integrated part of the camera housing in front of the camera lens and/or the camera viewfinder, and an operative erect position in which it is sufficiently removed from the lens to permit picture-taking substantially without the occurence of red-eye.

More to the point, in U.S. Pat. Nos. D. 284,973 and 285,087, a 35 mm camera comprises a camera housing and a flip-up flash unit including a head part having a flash emission window and a pair of supporting parts for the head part. The supporting parts are pivotally connected to the camera housing to permit swinging movement of the flash unit to a folded storage position in which the head part and the supporting parts cover respective portions of the camera housing and to a non-folded operative position in which the head part and the supporting parts are elevated from the camera housing with the flash emission window substantially facing a subject to be photographed and with one of the supporting parts located behind the other one to brace the first one. At least one of the supporting parts is releasably detented when the flash unit is in the folded or non-folded position to secure the flash unit in the respective positions.

SUMMARY OF THE INVENTION

As compared to the prior art examples described in the above-cited patents, the invention advantageously simplifies a photographic camera having a flip-up flash unit.

According to the invention, in a preferred embodiment, a photographic camera comprising (a) a camera housing and (b) a flip-up flash unit including a head part having a flash emission window and a pair of supporting parts for the head part pivotally connected to the camera housing to permit swinging movement of the flash unit to a folded storage position in which the head part and the supporting parts cover respective portions of the camera housing and to a non-folded operative position in which the head part and the supporting parts are elevated from the camera housing with the flash emission window substantially facing a subject to be photographed and with one of the supporting parts located behind the other one to brace the first one, is characterized in that:

the supporting part that is located behind the other one when the flash unit is in the non-folded position is resiliently flexible and is pivotally connected to the other one to be constrained to operate as an overcenter spring to urge the flash unit alternatively to the non-folded and folded positions.

Thus, with the invention, the need to releasably detent the flash unit in the folded and non-folded positions to secure the flash unit in those positions, as in U.S. Pat. Nos. D. 284,973 and 285,073, is obviated.

DETAILED DESCRIPTION OF THE PREFERRED EMBODIMENT

The invention is described as being embodied in a compact 35 mm camera with a built-in electronic flash unit. Because such photographic cameras have become well known, this description is directed in particular to camera elements forming part of or cooperating directly with the preferred embodiment. It is to be understood, however, that camera elements not specifically shown or described may take various forms known to persons of ordinary skill in the art.

Figure 1:
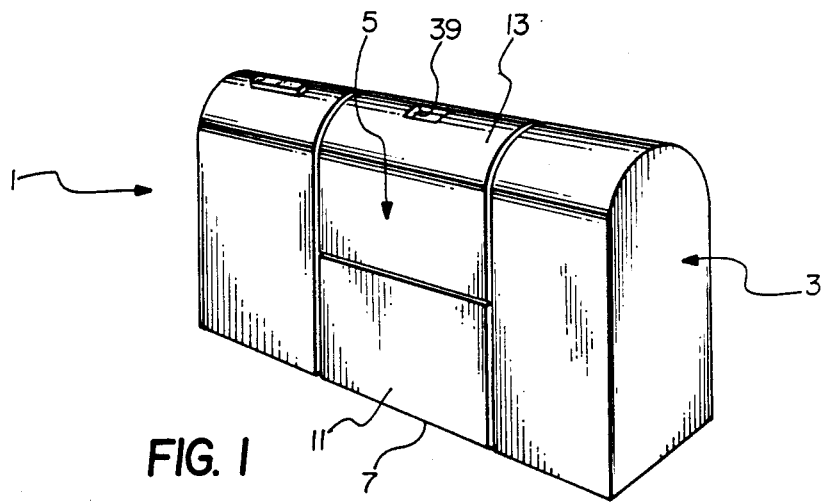
FIG. 1 is a front perspective view of a photographic camera with a flip-up flash unit according to a preferred embodiment of the invention, showing the flash unit in a folded storage position.
Figure 2:
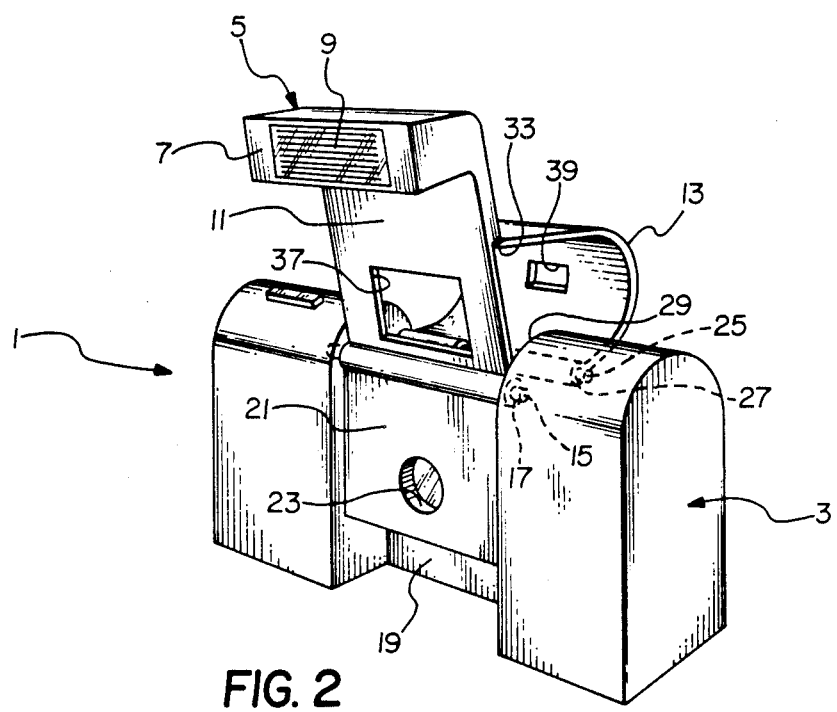
FIG. 2 is a view similar to FIG. 1, showing the flash unit in a non-folded operative position.

Referring now to the drawings, FIGS. 1 and 2 show a compact 35 mm camera 1 comprising a contoured housing 3 and a flip-up electronic flash unit 5. The flash unit 5 includes a plastic head part 7 having a flash emission window 9 and a pair of plastic front and rear supporting parts 11 and 13 for the head part. The front supporting part 11 is integrally formed with the head part 7, and is pivotally connected to the camera housing 3 by means of an axial pin 15 extending through an axial opening 17 in the front supporting part and having protruding opposite ends suspended by the camera housing. The pivotal connection of the front supporting part 11 to the camera housing 3 permits the flash unit 5 to be manually swung between a folded storage position, shown in FIGS. 1 and 3, in which the head part 7 fits within a lower recess 19 in the camera housing and the front supporting part fits within a front recess 21 in the camera housing to cover a lens opening 23, and a non-folded operative position, shown in FIGS. 2 and 5, in which the head part and the front supporting part are elevated from the camera housing with the flash emission window 9 substantially facing a subject to be photographed. The rear supporting part 13 is pivotally connected to the camera housing 3 by means of an axial pin 25 extending through an axial opening 27 in the rear supporting part and having protruding opposite ends suspended by the camera housing. The pivotal connection of the rear supporting part 13 to the camera housing 3 permits that part to be located within a top recess 29 in the camera housing when the flash unit 5 is in its folded position, shown in FIGS. 1 and 3, and to be elevated above the camera housing when the flash unit is in its non-folded position, shown in FIGS. 2 and 5. The rear supporting part 13 is resiliently flexible, and it is pivotally connected to the front supporting part 11 via a plastic "living" hinge 33 or other known pivot connection means. This allows the rear supporting part 13 to be constrained to operate as an overcenter spring to urge the flash unit 5 to its non-folded position and to its folded position. See FIGS. 3-5. When the flash unit 5 is in its non-folded position, the rear supporting part 13 braces the flash unit in that position. See FIGS. 2 and 5.

The front supporting part 11 has a rectangular front viewfinder opening 37, and the rear supporting part 13 has a rectangular rear viewfinder opening 39. The rear viewfinder opening 39 is smaller than the front viewfinder opening 37 and is located behind the front opening in alignment with that opening when the flash unit 5 is in its non-folded position to permit a subject to be photographed to be viewed through the two openings. See FIGS. 2 and 5. The rear supporting part 13 is bowed to arch rearwardly of the camera housing 3 when the flash unit 5 is in its non-folded position to locate the rear viewfinder opening 39 sufficiently removed from the camera housing to permit a photographer to place one eye at the rear opening without any interference (obstruction) by the camera housing. See FIG. 5. Conversely, when the flash unit 5 is in its folded position, the rear supporting part 13 covers the front viewfinder opening 37. See FIG. 3.

OPERATION

Figure 3:
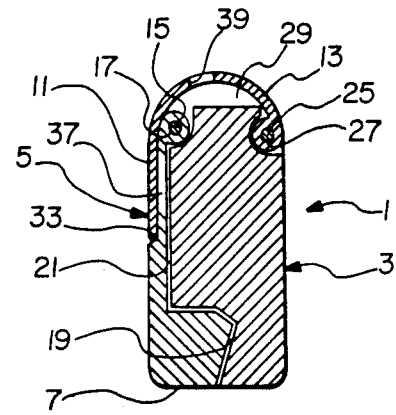
FIGS. 3, 4 and 5 are side elevation section views of the camera, showing progressive movement of the flash unit from its folded position to its non-folded position.
Figure 4:
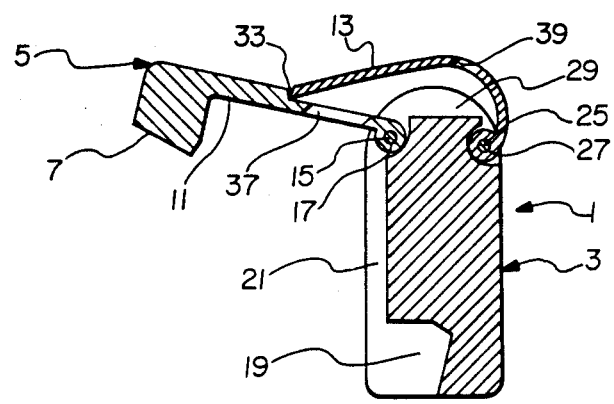
Figure 5:
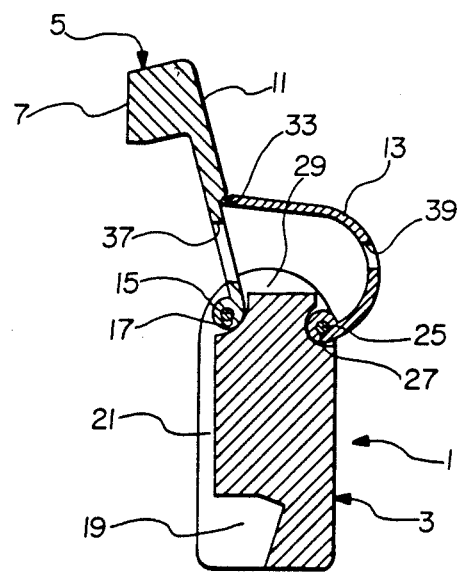

To use the 35 mm camera 1, the flash unit 5 must be manually swung from its folded position, shown in FIGS. 1 and 3, towards its non-folded position, shown in FIGS. 2 and 5. As the flash unit 5 is manually swung towards its non-folded position, the front supporting part 11 pushes against the rear supporting part 13 at the hinge 33 to swing the latter part out of the top recess 29. See FIG. 4. When the rear supporting part 13 is pushed beyond an overcenter position (not shown) of that part, the rear supporting part springs or snaps rearward pulling the front supporting part 11 with it to automatically urge the flash unit 5 to its non-folded position. See FIG. 5.

After picture-taking is completed, the flash unit 5 is manually swung from its non-folded position towards its folded position. As the flash unit 5 is manually swung towards its folded position, the front supporting part 11 pulls the rear supporting part 13 at the hinge 33 to the overcenter position. When the rear supporting part 13 is pulled beyond its overcenter position, the rear supporting part springs or snaps rearward pulling the front supporting part 11 to automatically urge the flash unit 5 to its folded position.

While the invention has been described with reference to a preferred embodiment, it will be understood that various modifications can be effected within the ordinary skill in the art without departing from the scope of the invention.

We claim:

1. A photographic camera comprising (a) a camera housing and (b) a flip-up flash unit including a head part having a flash emission window and a pair of supporting parts for said head part pivotally connected to said camera housing to permit swinging movement of said flash unit to a folded storage position in which the head part and said supporting parts cover respective portions of the camera housing and to a non-folded operative position in which the head part and the supporting parts are elevated from the camera housing with said flash emission window substantially facing a subject to be photographed and with one of the supporting parts located behind the other one to brace the first one, is characterized in that:

said supporting part that is located behind the other one when said flash unit is in the non-folded position is resiliently flexible and is pivotally connected to the other one to be constrained to operate as an overcenter spring to urge the flash unit alternatively to the non-folded and folded positions.

2. A photographic camera as recited in claim 1, wherein said supporting part that is located behind the other one when said flash unit is in the non-folded position is bowed to arch rearwardly of said camera housing at that time.

3. A photographic camera as recited in claim 1, wherein said supporting part that is located behind the other one when said flash unit is in the non-folded position is pivotally connected to the other one via a living hinge.

4. A photographic camera comprising (a) a camera housing and (b) a flip-up flash unit pivotally connected to said camera housing for swinging movement to a folded storage position in which the flash unit rests against the camera housing and to a non-folded operative position in which the flash unit is elevated from the camera housing, is characterized in that:

said flash unit includes overcenter spring means for urging the flash unit alternatively to the non-folded and folded positions.

5. A photographic camera as recited in claim 4, wherein said flash unit includes a head part and a supporting part for said head part, and said overcenter spring means is pivotally connected to said supporting part and to said camera housing.

* * * * *

UNITED STATES PATENT AND TRADEMARK OFFICE
CERTIFICATE OF CORRECTION

PATENT NO. : 4,983,999

DATED : January 8, 1991

INVENTOR(S) : William J. Meisenzahl, David J. Glogan, William L. Burnham

It is certified that error appears in the above-identified patent and that said Letters Patent is hereby corrected as shown below:

On the title page, under item [19], and in item [75], delete "Meisezahl" and replace with --Meisenzahl--.

Signed and Sealed this

Twenty-eighth Day of July, 1992

Attest:

DOUGLAS B. COMER

*Attesting Officer*  *Acting Commissioner of Patents and Trademarks*